United States Patent
Ono

(10) Patent No.: US 6,626,088 B2
(45) Date of Patent: Sep. 30, 2003

(54) HEATING, COOKING AND STERILIZING DEVICE

(75) Inventor: Takuji Ono, Okayama (JP)

(73) Assignee: Ono Foods Industrial Co., Ltd., Okayama (JP)

( * ) Notice: Subject to any disclaimer, the term of this patent is extended or adjusted under 35 U.S.C. 154(b) by 0 days.

(21) Appl. No.: 10/258,577

(22) PCT Filed: Apr. 23, 2001

(86) PCT No.: PCT/JP01/03452

§ 371 (c)(1), (2), (4) Date: Oct. 31, 2002

(87) PCT Pub. No.: WO01/84966

PCT Pub. Date: Nov. 15, 2001

(65) Prior Publication Data

US 2003/0101875 A1 Jun. 5, 2003

(30) Foreign Application Priority Data

May 8, 2000 (JP) ........................................ 2000-134400

(51) Int. Cl.[7] .............................. A23L 3/00; A23L 3/12; A23L 3/16; A47J 27/14; A47J 27/16
(52) U.S. Cl. .............................. 99/330; 99/331; 99/339; 99/340; 99/352; 99/355; 99/403; 99/467
(58) Field of Search .......................... 99/326–333, 339, 99/340, 352–355, 403–417, 467–476, 483; 126/20, 369; 219/401, 440, 415, 431; 426/510, 511, 438, 231, 233, 520–522, 523

(56) References Cited

U.S. PATENT DOCUMENTS

| | | | | |
|---|---|---|---|---|
| 2,827,379 A | * | 3/1958 | Phelan ....................... | 99/330 X |
| 2,938,648 A | * | 5/1960 | Phelan et al. .............. | 99/331 X |
| 3,194,662 A | * | 7/1965 | Nelson ....................... | 99/330 X |
| 3,563,158 A | * | 2/1971 | Omer .......................... | 99/326 |
| 3,613,550 A | * | 10/1971 | Thompson .................. | 99/330 |
| 3,655,411 A | * | 4/1972 | Albright ...................... | 99/330 |
| 3,809,777 A | * | 5/1974 | Thompson ................. | 99/352 X |
| 3,816,703 A | * | 6/1974 | Binks ......................... | 99/403 X |
| 4,968,516 A | * | 11/1990 | Thompson ................. | 99/330 X |

FOREIGN PATENT DOCUMENTS

| | | | |
|---|---|---|---|
| JP | 3-47062 | * | 2/1991 |
| JP | 4-144673 | * | 5/1992 |
| JP | 11-253311 | * | 9/1999 |

* cited by examiner

Primary Examiner—Timothy F. Simone
(74) Attorney, Agent, or Firm—Jones, Tullar & Cooper, P.C.

(57) ABSTRACT

Hitherto, a cooking apparatus and a preservative food preparing apparatus have been known and practically used exclusively for the purpose of cooking foods or preparing preservative foods. There has been an increasing demand for a cooking-and-preservative food preparing apparatus, and to meet this demand, a heating, cooking, and sterilizing apparatus according to the present invention is constructed as follows: a horizontal type of cylindrical heating-and-cooking oven (1) has numerous nozzles (7) provided therein. These nozzles (7) are connected to the outlet (37) of a heat exchange (25) positioned outside of the oven (1), and the bottom of the oven (1) is connected to the inlet (38) of the heat exchanger (25) via a return pipe (43), which is fixed to the bottom of the oven (1), thus forming a circulation line between the oven (1) and the heat exchanger (25). A circulation pump (40) is included in the circulation line. First and second tanks (42) and (51) are connected at their outlets to the drawing side of the circulation pump (40), and at their inlets to the discharging side of the circulation pump (40) in such a way that the first and second tanks (42) and (51) may be selectively connected to the heat exchanger (25). A washing water tank (67) is selectively connected to the first and second tanks 42 and (51), and the oven (1) can be connected to a compressed air supply source (19) and an inert gas source. The oven is equipped with different sensors (9) to (12) for monitoring some factors.

2 Claims, 4 Drawing Sheets

ND STERILIZING
HEATING, COOKING AND STERILIZING DEVICE

TECHNICAL FIELD

The present invention relates to a cooking-and-sterilizing apparatus which can be equally used both in cooking foods by spraying heated aqueous seasoning solutions directly on the foods for cooking and in preparing preservative cooked foods by heating, cooking, and sterilizing the foods that are preliminary sealed in bags or containers.

BACKGROUND ART

The inventor developed an apparatus for preparing inert gas-filled packages of preservative cooked foods by putting semi-cooked foods along with seasonings in gas-impermeable bags, replacing the air with nitrogen in the bags, and subjecting the foods stacked in the bags to a series of thermal cooking and sterilizing steps for a short time, and the inventor filed a patent application for claiming the cooking and sterilizing apparatus for a patent (Republished Patent WO95/23526). Also, the inventor developed an apparatus for cooking foods directly by spraying hot aqueous seasoning solutions on raw materials, and the inventor filed a patent application for claiming the cooking apparatus for a patent (Japan Patent Application Laid-Open No. H-11-253311).

These apparatuses, however, can be used exclusively for the sole purpose, and therefore, there has been an increasing demand for an apparatus which can be used commonly both in cooking foods and in preparing preservative cooked foods.

The object of the present invention is to provide a heating, cooking, and sterilizing apparatus which is capable of cooking raw materials directly and of preparing preservative cooked foods.

DISCLOSURE OF THE INVENTION

Summary of the Invention

To attain this object a heating, cooking, and sterilizing apparatus according to the present invention comprises:

a horizontal type of cylindrical heating-and-cooking oven having a door provided on one end for putting in and taking out foods from the inside of the oven;

numerous nozzles arranged on the opposite sides of the inside of the oven and inner-directed toward the center of the oven, which are distributed to numerous branch pipes laid outside of the oven;

a heat exchanger, the inlet of said heat exchanger being connected to the bottom of the oven via a return conduit, and the outlet of the heat exchanger being connected to the nozzles via the branch pipes so that a circulation line may be formed between said heat exchanger and the heat exchanger and the oven;

a circulation pump placed in the circulation line;

first to fourth tanks whose outlets and inlets can be selectively connected to the drawing and discharging sides of said circulation pump;

a compressed air source, a nitrogen gas tank and a vacuum pump, all of which are connected to the oven;

a temperature sensor for detecting inner temperature of the oven, a center temperature sensor for detecting center temperature of foods, and an inner pressure sensor for detecting inner pressure of the oven, all associated with the oven; and a control section for controlling the temperature and pressure of the oven in response to the signals from the temperature sensors and pressure sensor, and for permitting the inner-directed nozzles to eject aqueous seasoning solutions, hot water, or cooling water according to the software program installed in the control section.

When the apparatus works in the direct cooking mode that cooks foods directly by spraying hot aqueous seasoning solutions on raw materials, for example, the first tank containing an aqueous seasoning solution is connected to the circulation line, and the control section has functions of: allowing the aqueous seasoning solution to circulate in the circulation line; spraying the aqueous seasoning solution on the food in the oven while controlling the inner pressure of said oven and the temperature of the heat exchanger in response to the signals from the temperature sensors and pressure sensor; allowing the aqueous seasoning solution to circulate between the heat exchanger and the oven; and bringing the aqueous seasoning solution back to the second tank after finishing the required cooking.

When the apparatus works in the preservative food-preparing mode that cooks and heat-sterilize prepackaged foods, the third tank is filled with hot water and at the same time the fourth tank is filled with cold water, and the control section has functions of: supplying the oven with the hot water from the third tank, and supplying the oven with the cold water from the fourth tank to cool the oven subsequent to termination of the cooking and sterilizing of the prepackaged foods with heat of the hot water, while controlling the inner pressure of the oven and the temperature of the heat exchanger in response to the signals from the temperature sensors and pressure sensor.

DESCRIPTION OF THE PREFERRED EMBODIMENTS

Figure 1:
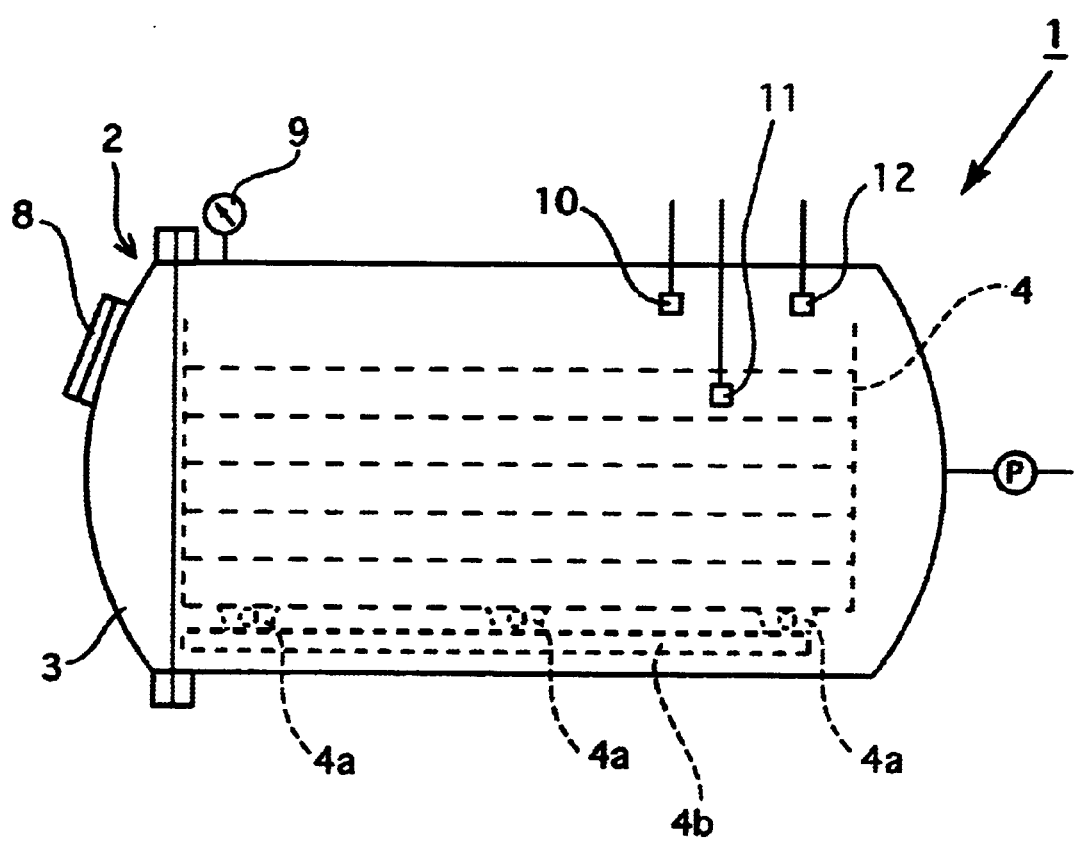
FIG. 1 is a side view of a heating, cooking, and sterilizing apparatus.

Referring to FIG. 1, a heating, cooking, and sterilizing apparatus according to one embodiment of the present invention comprises a horizontal type of cylindrical heating-and-cooking oven 1. It has a door or circular cover plate 3 provided on its front side for putting in and taking out foods from the inside of the oven. The oven 1 is closed on its rear side. The circular cover plate 3 is shown as closing the food inlet/outlet 2 of the oven 1.

A food carrier 4 has wheels 4a and a plurality of food shelves 4c arranged in its frame. It can move on a pair of rails 4b laid on the bottom inside the oven 1.

Numerous feeding pipes 6 are arranged vertically, and are closed at their top ends. As seen from FIG. 2, these feeding pipes 6 stand upright on the opposite sides of the inside of the oven 1 and penetrate the oven 1. Numerous nozzles 7 are fixed to the feeding pipes 6 and directed toward foods on the food shelves 4c of the food carrier 4 in the oven 1.

The cover plate 3 has a watching window 8 for watching the inside of the oven 1, and the oven 1 is equipped with a pressure sensor 9, a temperature sensor 10, a center temperature sensor 11, and a nitrogen density detecting sensor 12.

Figure 3:
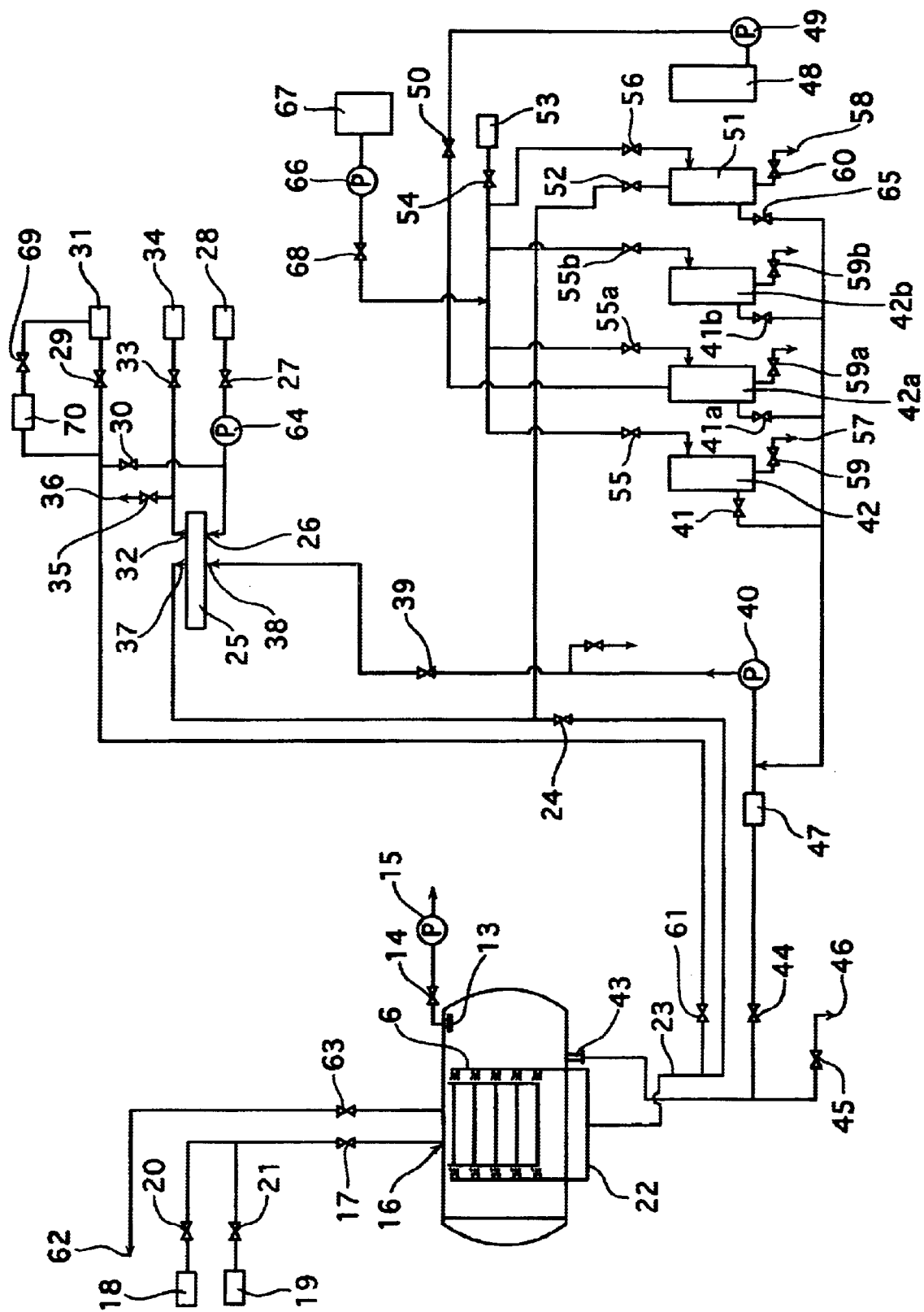
FIG. 3 shows how the parts of the apparatus are connected to each other.

Various devices as seen in FIG. 3 are connected to the oven 1.

The oven 1 has an air outlet 13 made in its ceiling, and the inside of the oven 1 is connected to a vacuum pump 15 via an opening/closing valve 14.

Also, the oven 1 has a gas inlet 16 made in its ceiling, thus permitting the oven 1 to be supplied with nitrogen or compressed air from an inert gas supply tank 18 and an air supply tank 19 via an opening/closing valve 17.

The inert gas supply tank 18 and the air supply tank 19 are connected to the gas inlet 16 of the oven 1 via associated opening/closing valves 20 and 21.

Figure 2:
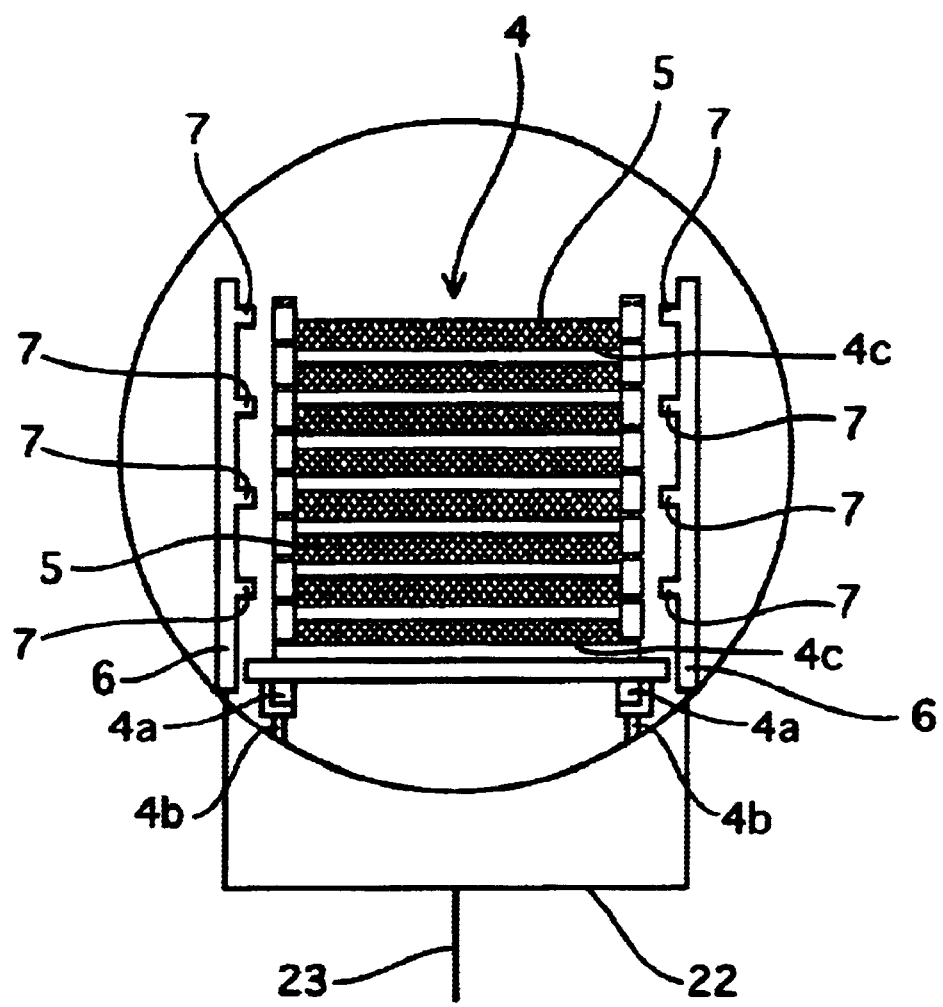
FIG. 2 is a front view of the heating, cooking, and sterilizing apparatus with its door open.
Figure 4:
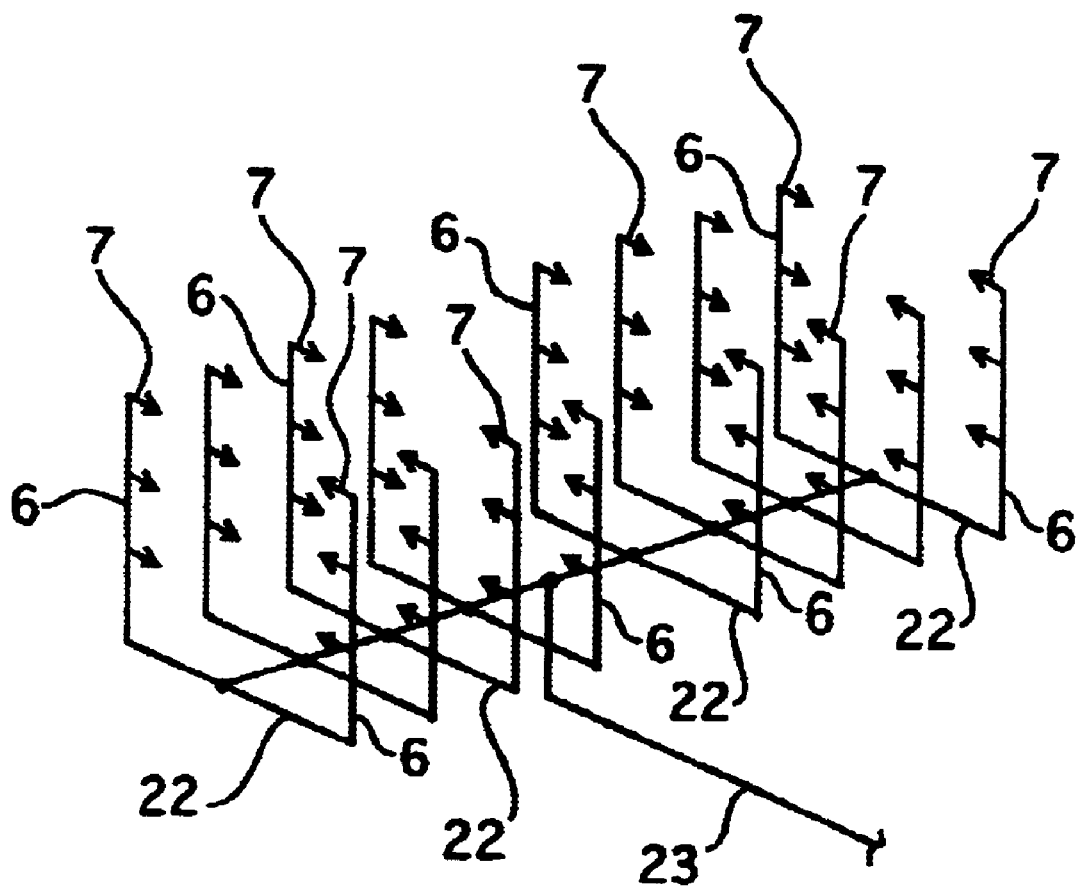
FIG. 4 illustrates the piping in the oven.

As seen from FIGS. 2 and 4, the feeding pipes 6 standing upright on the opposite sides of the inside of the oven 1 are connected at their lower ends to horizontal branch pipes 22, which are laid outside of the oven 1. All branch pipes 22 are connected to a trunk pipe 23, which is connected to the outlet side 37 of the heat exchanger 25 via an opening/closing valve 24.

Placing the branch and trunk pipes 22 and 23 outside of the oven 1 permits expansion of the space available inside of the oven 1 to the extremity. Also, distribution of nozzles 7 on the numerous branch pipes 22 assures that the pressures be equalized in all nozzles 7.

A cooling water supply tank 28 is connected to the thermal medium inlet 26 of the heat exchanger 25 via an associated pump 64 and an opening/closing valve 27, and a steam supply source 31 is connected to the thermal medium inlet 26 of the heat exchanger 25 via associated opening/closing valves 29 and 30. A cooling water withdrawal tank 34 is connected to the thermal medium outlet 32 of the heat exchanger 25 via an associated opening/closing valve 33.

The steam supply 31 is connected to the trunk pipe 23 via opening/closing valves 29 and 61, and via an opening/closing valve 69 and a superheated steam generator 70.

A first tank 42 is connected to the inlet 38 of the heat exchanger 25 via an associated opening/closing valve 41, a pump 40, and an opening/closing valve 39.

A return conduit 43 is connected on one end to the bottom of the oven 1, and on the other end to the pump 40 via an opening/closing valve 44, and to a drain pipe 46 via an associated opening/closing valve 45.

A filter 47 is placed on the upstream side of the pump 40, removing foreign substances from the liquid discharged from the return conduit 43.

An aqueous seasoning solution tank 48 is connected to the first tank 42 via an associated pump 49 and opening/closing valve 50, supplying the first tank 42 with thick aqueous seasoning solution to control the density of the aqueous seasoning solution contained therein.

A second tank 51 is connected to the outlet 37 of the heat exchanger 25 via an associated opening/closing valve 52, and is connected to the pump 40 via an associated opening/closing valve 65.

A water supply source 53 is connected to the first tank 42 via associated opening/closing valves 54 and 55 to reduce the density of the aqueous seasoning solution in the first tank 42. Also, the water supply source 53 is connected to the second tank 51 via associated opening/closing valves 54 and 56 to supply the second tank 51 with cooling water.

A washing water tank 67 is connected to the first tank 42 via an associated pump 66 and opening/closing valves 68 and 55. Also, it is connected to the second tank 51 via associated opening/closing valves 68 and 56. Thus, the first and second tanks 42 and 51 can be supplied with washing water when occasions demand.

The first and second tanks 42 and 51 are connected to associated drain pipes 57 and 58 via opening/closing valves 59 and 60 respectively.

The oven 1 is connected to a vent 62 via an associated opening/closing valve 63.

The manner in which a given food material is cooked directly in the heating, cooking, and sterilizing apparatus is described below: perforated trays 5 containing the food material such as soy beans or black soy beans are put on the shelves 4c of the wheeled carrier 4. The circular cover plate 3 of the oven 1 is opened and the wheeled carrier 4 is put on the rails 4b in the oven 1 to be pushed in the oven 1 through the food inlet/outlet 2.

Then, the cover plate 3 is closed, and the oven 1 is supplied with hot water. Thus, the food material is softened, and at the same time, its harshness is removed. The hot water is supplied from the heat exchanger 25, in which the water from the first tank 42 is heated.

Specifically, the opening/closing valves 41 and 39 are opened to allow the pump 40 to move water from the first tank 42 to the heat exchanger 25. At the same time, the opening/closing valves 29 and 30 are opened to allow the steam supply source 31 to supply the steam to the thermal medium inlet 26 of the heat exchanger 25, thereby producing hot water by heating the water from the first tank 42.

The hot water is made to flow in the opening/closing valve 24, the trunk pipe 23, the branch pipes 22, and the feeding pipes 6, allowing the inner-directed nozzles 7 to spray the hot water on the raw food materials on the carrier 4. Each nozzle 7 has a slot formed on its outlet, causing the hot water to fan out and spread a relatively wide range.

The opening/closing valve 41 is closed, and the opening/closing valve 44 is opened.

The hot water falling and remaining on the bottom of the oven 1 is drawn by the pump 40 to flow back to the heat exchanger 25 via the return pipe 43, the opening/closing valve 44, and the filter 47, and then, the hot water returns to the oven 1 after being reheated in the heat exchanger 25.

After finishing the softening and harshness-removing of the raw food material, the opening/closing valves 29 and 30 upstream of the thermal medium inlet 26 of the heat exchanger 25 are closed, and at the same time, the hot water is drained from the drain pipe 46. Then, the opening/closing valves 41, 39, and 24 are opened, and the pump 40 is made to start, thereby supplying the oven 1 with the water from the first tank 42. The opening/closing valves 27 and 33 are opened to supply the cold water from the cold water tank 28 to the thermal medium inlet 26 of the heat exchanger 25. Thus, the water from the first tank is cooled in the heat exchanger 25 to be directed to the oven 1 for cooling the inside of the oven 1.

After cooling the inside of the oven 1 the water is drained from the oven 1 through the drain pipe 46, and then fresh water is supplied from the first tank 42 to the oven 1, so that the water is sprayed on the food for washing. Used water is drained through the drain pipe 46. Washing can be repeated two or more times to meet occasional demand.

After washing the inside of the oven 1, the first tank 42, in its turn, is washed with the washing water from the washing water tank 67, and then it is supplied with the aqueous seasoning solution from the aqueous seasoning solution tank 42. The heat exchanger 25 is supplied with the steam from the steam supply source 31 to heat the aqueous seasoning solution in the heat exchanger 25. The aqueous seasoning solution thus heated is supplied to the feeding pipes 6 in the oven 1 via the branch pipe 22 to be sprayed on the food from the nozzles 7.

Thus, the food in the oven 1 is exposed evenly to the hot mist of seasoning so that the food may be heated, seasoned, and cooked.

The aqueous seasoning solution remaining on the bottom of the oven 1 flows through the return pipe 43 to be circulated as is the case with circulation of the hot water as described above.

After cooking the food, the aqueous seasoning solution is collected in the second tank 51 and the cover plate 3 is opened to pull the carrier 4 bearing the cooked food out of the oven 1.

In preparing "Teriyaki chickens (chickens broiled with soy)", chickens are seasoned and exposed to the mist of the superheated steam. Specifically the inside of the oven 1 is depressurized by allowing the vacuum pump 15 to draw the air from the inside of the oven 1, and then the opening/closing valves 17 and 20 are opened to supply the oven 1 with the inert gas from the gas supply tank 18. Thus, the air in the oven 1 is replaced by the inert gas.

Then, the opening/closing valves 69 and 61 are opened, and the opening/closing valves 29 and 30 are closed. Thus, the steam from the steam supply source 31 is superheated by the superheated steam generator 70, and the so superheated steam is supplied directly to the feeding pipes 6 to be sprayed on the food.

"Seasoned, boiled soy beans" can be prepared as follows:

1) Pre-Treatment: soy beans are soaked in water for 7 to 10 hours.

2) Removal of Harshness and Softening: pre-treated soy beans are contained in small perforated trays, and the small perforated trays thus filled with pre-treated soy beans are laid on each other in the oven 1. Cold water is directed from the cooling water supply tank 28 to the secondary side of the heat exchanger 25, and the superheated steam is directed to the primary side of the heat exchanger 25, thus providing hot water of 108° C. on the secondary side of the heat exchanger 25. The hot water thus produced is directed to the feeding pipes 10 to be sprayed from the nozzles 12 on the soy beans in the small perforated trays for 8 minutes. Thus, harshness is removed from the soy beans, and the soy beans are softened.

3) Cooling: cold water is directed to the primary side of the heat exchanger 25 to cool the hot water on the secondary side of the heat exchanger 25. The cooled water is sprayed on the harshness-free, softened soy beans in the small perforated trays for 5 minutes.

4) Washing: cold water is directed from the cooling water supply tank 28 to be circulated in the circulation line, and the cold water is drained in 5 minutes. This washing is repeated three times.

5) Seasoning: an aqueous seasoning solution is directed to the secondary side of the heat exchanger 25 while the superheated steam is directed to the primary side of the heat exchanger 25. The aqueous seasoning solution of 100° C. is sprayed on the soy beans in the small perforated trays for 20 minutes.

6) Cooling: cold water is directed to the primary side of the heat exchanger 25, thereby lowering the temperature of the aqueous seasoning solution to about 40° C. in 10 minutes. Thus, the food can be taken out from the oven 1.

7) Taking Out: the seasoned, boiled soy beans are taken out from the oven 1.

"Seasoned, boiled cubic pork" can be prepared as follows:

1) Removal of Lard: cubic pieces of pork are contained in small perforated trays, and the small perforated trays thus filled with cubic pieces of pork are laid on each other in the oven 1. Cold water is directed from the cooling water supply tank 28 to the secondary side of the heat exchanger 25, and the superheated steam is directed to the primary side of the heat exchanger 25, thus providing hot water of 100° C. on the secondary side of the heat exchanger 25. The hot water thus produced is directed to the feeding pipes 10 to be sprayed from the nozzles 12 on the cubic pieces of pork in the trays for 60 minutes.

2) Cooling: cold water is directed to the primary side of the heat exchanger 25 to cool the hot water on the secondary side of the heat exchanger 25. The cooled water is sprayed on the cubic pieces of pork in the small perforated trays for 5 minutes.

3) Washing: cold water is directed from the cooling water supply tank 28 to be circulated in the circulation line, and the cold water is drained in 5 minutes. This washing is repeated three times.

4) Seasoning: the inside of the oven 1 is depressurized, and then an aqueous seasoning solution is directed to the secondary side of the heat exchanger 25 while the superheated steam is directed to the primary side of the heat exchanger 25. The aqueous seasoning solution of 70° C. is sprayed from the nozzles 7 onto the cubic pieces of pork in the small perforated trays for 20 minutes.

5) Cooling: cold water is directed to the primary side of the heat exchanger 25, thereby lowering the temperature of the aqueous seasoning solution to about 40° C. in 10 minutes.

6) Taking Out: the seasoned, boiled cubic pieces of pork are taken out from the oven 1.

"Broiled sweet chestnuts" can be prepared as follows:

Pre-treated sweet chestnuts are contained in small perforated trays, and the small perforated trays thus filled with sweet chestnuts are laid on each other in the oven 1. Cold water is directed from the cooling water supply tank 28 to the secondary side of the heat exchanger 25, and the superheated steam is directed to the primary side of the heat exchanger 25, thus providing hot water of 100° C. on the secondary side of the heat exchanger 25. The hot water thus produced is directed to the feeding pipes 10 to be sprayed from the nozzles 12 on the sweet chestnuts in the small perforated trays for 1 minute. Then, the inner pressure of the oven 1 is lowered, and the oven is cooled for 15 minutes.

The food thus treated or cooked has been sterilized primarily, and therefore, it can be packaged by inserting it in KOP or other gas-barrier bags or containers. The so packaged food can be stored 15 to 20 days long in preservative condition if it is put in a refrigerating showcase (3° C.), and 3 months long in preservative condition if it is put in a deep-frozen condition (minus 20° C.).

If the cooked food is to be subjected to the secondary sterilization, the food is packaged by putting it in an alumina-laminated synthetic resin bag, and the so packaged food is subjected to a low-temperature sterilization (90° C.). The so sterilized food can be preserved one to two months long at normal temperature.

Assuming that the apparatus according to the present invention works in the preservative food-preparing mode and sterilizes the cooked food as hereinafter described, the food thus prepared can be preserved three to twelve months long at normal temperature.

The apparatus according to the present invention has an advantage that its operating mode can be switched swiftly from the direct cooking mode to the sterilizing mode so that both cooking and sterilizing of food can be performed in the same apparatus.

When the apparatus works in the preservative food-preparing mode, the first tank 42 is filled with hot water, and the second tank 51 is filled with cold water. Then, the inner pressure of the oven 1 is controlled appropriately, and the hot water from the first tank 42 is heated still higher in the heat exchanger 25 before being supplied to the feeding pipes 6.

In case that the apparatus is switched from the direct cooking mode to the preservative food-preparing mode, the remaining aqueous seasoning solution is drained from the first tank 42, and then the first tank 42 is supplied with washing water from the washing water tank 67 for rinsing. The required rinsing is effected automatically when switching to the preservative food-preparing mode. Finally the first tank 42 is filled with hot water.

The temperature of the hot water is controlled in the following order: first, the 100° C.-high hot water is circulated (primary temperature-rising step); second, the hot water is allowed to remain at the temperature of 100° C. for a while (constant temperature-keeping step); and third, the 125° C.-high hot water is circulated (sterilizing step).

Thereafter, the opening/closing valves 29 and 30 upstream of the thermal medium inlet 26 of the heat exchanger 25 are closed, and the opening/closing valves 27 and 33 are opened to supply the cold water from the cold water tank 28 to the thermal medium inlet 26 of the heat exchanger 25 by using the pump 64. Thus, the temperature of the circulating hot water is lowered so that the food may be cooled to the extent of permitting the food to be taken out of the oven 1. Then, the hot water is collected to the first tank 42. The opening/closing vale 65 is opened to supply the cold water from the second tank 51 to the feeding pipes 6, thereby effecting the secondary cooling of the food.

A microcomputer (not shown) is responsive to the signals from the inner pressure sensor 9, the temperature sensor 10, and the center temperature sensor 11 for effecting a series of controlling operations according to the sequencer program as described above.

For example, in preparing "beef and burdock lightly broiled with soy", first, sliced pieces of burdock are put in a 60° C.-high weak acid bath for 30 minutes, and the so treated sliced pieces of burdock is blanched in a 160° C.-high oil for ten seconds.

A lump of frozen beef is defrosted and sliced, and the sliced pieces of beef are blanched in a 180° C.-high oil for five to ten seconds as a preliminary treatment.

The sliced pieces of burdock and beef thus blanched are mixed together, and are packaged by putting predetermined quantities of beef-and-burdock mixture in gas-impermeable bags and by replacing the air by an inert gas in the bags to be sealed. The so packaged food is subjected to a multi-stage sterilization, which is composed of: heating at the temperature of 102° C. for 20 minutes; heating at the temperature of 110° C. for 10 minute; and heating at the temperature of 120° C. for 5 minutes. Then, the sterilized food is cooled, and is marketed.

"Lightly seasoned, boiled vegetables" can be prepared as follows: pre-treated pieces of vegetables are weighed to be put in gas-barrier containers. The air is replaced by an inert gas in all containers, and then they are sealed. The gas-tight sealed containers are subjected to a multi-stepped treatment of heating-and-sterilizing, 102° C. for 30 minutes and 110° C. for 10 minutes. Then, the sterilized food is cooled, and is marketed.

"Yellowtail broiled with soy" can be prepared as follows: pre-treated sliced pieces of yellowtail are weighed to be put in gas-barrier containers. The air is replaced by an inert gas in all containers, and then they are sealed. The gas-tight sealed containers are subjected to a multi-stepped treatment of heating-and-sterilizing, 100° C. for 5 minutes, 110° C. for 30 minutes, and 115° C. for 10 minutes. Then, the sealed containers are cooled, and are marketed.

In the embodiment as described above, the first tank 42 is described as being used to contain an aqueous seasoning solution, water or hot water, and the second tank 51 is described as being used to contain an aqueous seasoning solution or cooling water collected from the oven 1. Two tanks may be added, and the total of four tanks may be allotted to the aqueous seasoning solution 42a, hot water 42, collected aqueous seasoning solution 51, and cooling water 42b. This makes it unnecessary to change the liquid in the tank, and therefore the switching to an alternative mode will be expedited.

Nitrogen is used as an inert gas to be provided in the oven 1, and accordingly the nitrogen density detecting sensor 12 is used. Carbonic acid gas, however, may be equally used, and then, a carbonic acid gas sensor may be used instead of the nitrogen density detecting sensor 12.

INDUSTRIAL APPLICABILITY

In a heating, cooking, and sterilizing apparatus according to the present invention; a horizontal type of cylindrical heating-and-cooking oven has a door provided on one end for putting in and taking out foods from the inside of the oven, and numerous nozzles provided on the opposite sides of the inside of the oven and inner-directed toward the center of the oven. These nozzles are distributed to numerous branch pipes laid outside of the oven and via said branch pipes connected to the outlet of a heat exchanger positioned outside of the oven, and the bottom of the oven is connected to the inlet of the heat exchanger via a return pipe, which is fixed to the bottom of the oven, thus forming a circulation line between the oven and the heat exchanger. A circulation pump is included in the circulation line, and first to fourth tanks are connected at their outlets to the drawing side of the circulation pump, and at their inlets to the discharging side of the circulation pump in such a way that the first to fourth tanks may be selectively connected to the heat exchanger. The oven can be connected to a compressed air supply source, a nitrogen gas tank, and a vacuum pump. The oven is equipped with a temperature sensor, a center temperature sensor, and an inner pressure sensor, and, the temperature and pressure of the oven are controlled in response to the signals from these sensors. The nozzles are permitted to spray on the food an aqueous seasoning solution, steam, hot water, or cooling water according to the software program installed in the control section.

The heating, cooking, and sterilizing apparatus can be used in two different working modes, that is, direct food-cooking mode and preservative food-preparing mode, thus doubly expanding the horizon of use. The present invention also assures that the pressures be equalized in all the nozzles.

I claim:

1. A heating, cooking, and sterilizing apparatus comprising:

a horizontal type of cylindrical heating-and-cooking oven having a door provided on one end for putting in and taking out foods from the inside of the oven;

a plurality of nozzles arranged on the opposite sides of the inside of the oven and inner-directed toward the center of the oven, which are distributed to a plurality of branch lines laid outside the oven;

a heat exchanger, the inlet of said heat exchanger being connected to the bottom of said oven via a return conduit, and the outlet of said heat exchanger being connected to said nozzles via said branch lines so that a circulation line may be formed between said heat exchanger and said oven;

a circulation pump placed in the circulation line;

first to fourth tanks whose outlets and inlets can be selectively connected to the drawing and discharging sides of said circulation pump;

a compressed air source, a nitrogen gas tank and a vacuum pump, all of which are connected to said oven;

a temperature sensor, a center temperature sensor, and an inner pressure gauge all associated with said oven; and a control section for controlling the temperature and pressure of said oven in response to the signals from said temperature sensors and pressure gauge, and for permitting the nozzles to eject aqueous seasoning solutions, hot water, or cooling water according to the software program installed in the control section.

2. A heating, cooking, and sterilizing apparatus according to claim 1, wherein said four tanks may be allotted to the aqueous seasoning solution, hot water, collected aqueous seasoning solution, and cooling water.

* * * * *